Dec. 7, 1948. J. H. HOLAN ET AL 2,455,417
VEHICLE BODY TOOL COMPARTMENT CONSTRUCTION
Filed Jan. 1, 1945

INVENTORS
JAMES H. HOLAN and
HERMAN J. TROCHE
BY Bates, Teare, v McBean
ATTORNEYS Patented Dec. 7, 1948

2,455,417

UNITED STATES PATENT OFFICE 2,455,417

VEHICLE BODY TOOL COMPARTMENT CONSTRUCTION

James H. Holan, Rocky River, and Herman J. Troche, Cleveland Heights, Ohio, assignors to The American Coach & Body Company, Cleveland, Ohio, a corporation of Ohio Application January 1, 1945, Serial No. 570,928

1 Claim. (Cl. 296—24)

This invention relates to vehicle body constructions and particularly to vehicles that are used in public utility equipment, wherein the sides of the body are constructed to have tool compartments, access to which is provided through openings in the outer side walls thereof. Usually such compartments have hinged closures, many of which are hinged at the bottom to facilitate the insertion and removal of tools, particularly where the compartments are located below the level of the operator's eye.

Where the compartment closures have been hinged along the bottom edges thereof, there is a considerable amount of space which heretofore has generally been unused. Should an effort be made to use the space by filling the compartment with hand tools, then they would be apt to fall out whenever the door would be opened.

An object of the present invention is to provide an apparatus by means of which the compartment space, heretofore unused, might be advantageously used for the storage of relatively small articles. An additional object is to construct storage means in the form of removal trays or drawers which are constructed of transparent material, and which are so proportioned with respect to the support thereof that they may be securely retained in place while the vehicle is in motion, and yet may be readily withdrawn for the insertion or removal of contents from the drawers.

Figure 1:
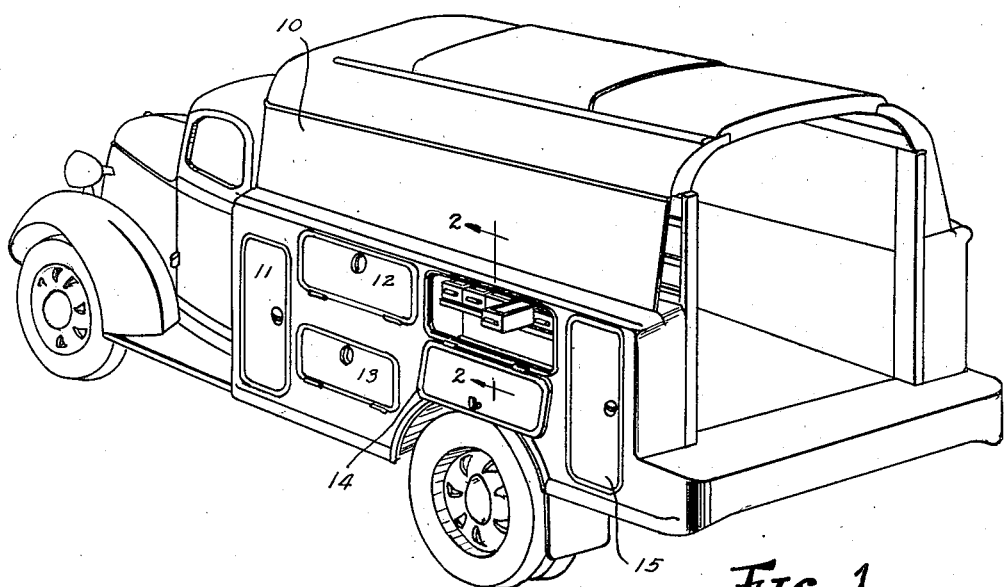
Figure 2:
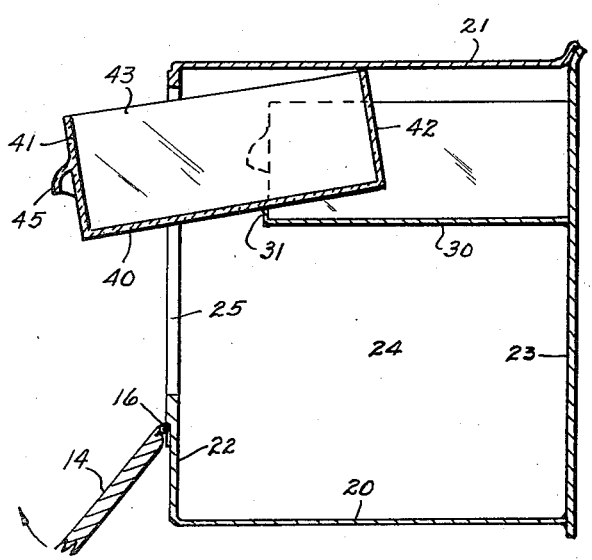

Referring now to the drawings, Fig. 1 is a perspective view of a vehicle body having our invention utilized therein, and Fig. 2 is a transverse vertical section taken on a plane indicated by the line 2—2 in Fig. 1.

We have shown our invention in connection with a vehicle body that is particularly adapted for public utility use, wherein the body, designated in general at 10, has tool compartments in the side walls thereof, access to which may be had through openings adapted to be closed by doors 11, 12, 13, 14 and 15, respectively. The doors 12, 13 and 14 are hinged at the bottom edges thereof as may be seen in Fig. 2 where the hinge is designated at 16. Each compartment has a bottom wall 20, a top wall 21, a front wall 22, a back wall 23 and end walls 24. Each front wall 22 has an opening 25 through which tools may be inserted into the compartment and, as shown in Fig. 2, the top of the opening is adjacent the top wall 21, while the bottom of the opening is spaced a considerable distance from the bottom of the compartment.

Normally, the tools or other articles placed within each compartment are kept below the level of the bottom edge of the opening 25 so as to facilitate insertion and removal thereof from the compartment, hence, the space above the bottom of each door opening is normally unused. Our invention enables the aforesaid normally unusable space to be utilized advantageously for storing relatively small articles in a way that enables them to be inserted or withdrawn in a convenient manner.

We carry out our invention by mounting a partition 30 between the end walls of the compartment and extending forwardly from the rear wall to a point short of the front wall. The partition is disposed in the upper part of the compartment and is provided with a flange 31 which extends upwardly at the forward edge thereof, and is co-extensive with the length of the partition. The partition may be rigidly fastened to the compartment walls in any convenient manner, as by welding.

The partition 30 provides a support for a plurality of removable trays or drawers, each of which comprises a one-piece structure of transparent material having a bottom wall 40, a front wall 41, a back wall 42, side walls 43 and an open top. In addition, the front wall of each tray has a finger grip drawer pull 45 which may be formed integrally with the front wall.

To hold each tray in place while the vehicle is in motion, the length thereof is complementary to the distance between the rear wall 23 and the flange 31, and to permit the tray to be readily inserted or withdrawn, the distance between the top and bottom edge of each tray is less than the distance between the top of the flange 31 and the inside surface of the wall 21. Moreover, the top of the opening 25 is sufficiently high that the drawer may be either completely removed from the tool compartment or may be retained in partially withdrawn position, as is shown in Fig. 2, while resting on the top edge of the flange and engaging the undersurface of the top wall 21. In such position, the drawers are accessible for immediate use without materially interfering with the removal of tools or equipment from the compartment.

By making the trays of transparent material and molding them in a one-piece construction, the contents of each tray are discernible by inspection without necessitating removal from the supporting partition, wherefore a saving in time is effected in the use of the equipment. Moreover, by mounting the trays on a supporting partition, so as to have them occupy the upper portion of the compartment, we utilize a space that would otherwise be empty, and in this way we greatly increase the carrying capacity of each vehicle body.

We claim:

A vehicle body having a tool carrying compartment in the side wall thereof and an opening therein providing access to the compartment, a closure adapted to close the opening, said compartment having a top, bottom, back, and end walls, there being a front wall in which said opening is located, a substantially horizontal supporting member in the upper portion of the compartment extending between the end walls and forwardly from the back wall and terminating short of said opening, whereby substantially the full area of the opening is available for the passage of articles adapted to be held in said compartment below said horizontal member, said member having an upwardly extending flange extending across the forward edge thereof, and one or more containers adapted to be supported on said member and each held in place thereon by said flange, the distance between the top of the flange and the top wall of the compartment being greater than the depth of the container, whereby each container may be withdrawn through said opening when lifted over the flange, the length and height of each container being so proportioned with respect to the length of said supporting member and to the distance between the flange and the front of the compartment and to the distance between the flange and the top of the compartment that each container may be suspended in various tilted positions with a portion thereof disposed outside the opening into the compartment, while the topmost portion adjacent the inner end of the container engages the top of the compartment, whereby each container may be supported in a position accessible for the insertion of articles thereinto or removal of articles therefrom.

JAMES H. HOLAN.
HERMAN J. TROCHE.

REFERENCES CITED

The following references are of record in the file of this patent:

UNITED STATES PATENTS

| Number | Name | Date |
|---|---|---|
| Re. 15,106 | Peters | May 17, 1921 |
| 372,352 | Bailey | Nov. 1, 1887 |
| 666,359 | Schroeder | Jan. 22, 1901 |
| 1,317,044 | Shannon | Sept. 23, 1919 |
| 1,399,956 | Garwood | Dec. 13, 1921 |
| 1,473,850 | Greene | Nov. 13, 1923 |
| 2,159,022 | Hawkins | May 23, 1939 |
| 2,178,511 | Kucher | Oct. 13, 1939 |
| 2,266,870 | Kraeft | Dec. 23, 1941 |
| 2,376,411 | Ahrndt | May 22, 1945 |